Patented Feb. 19, 1924.

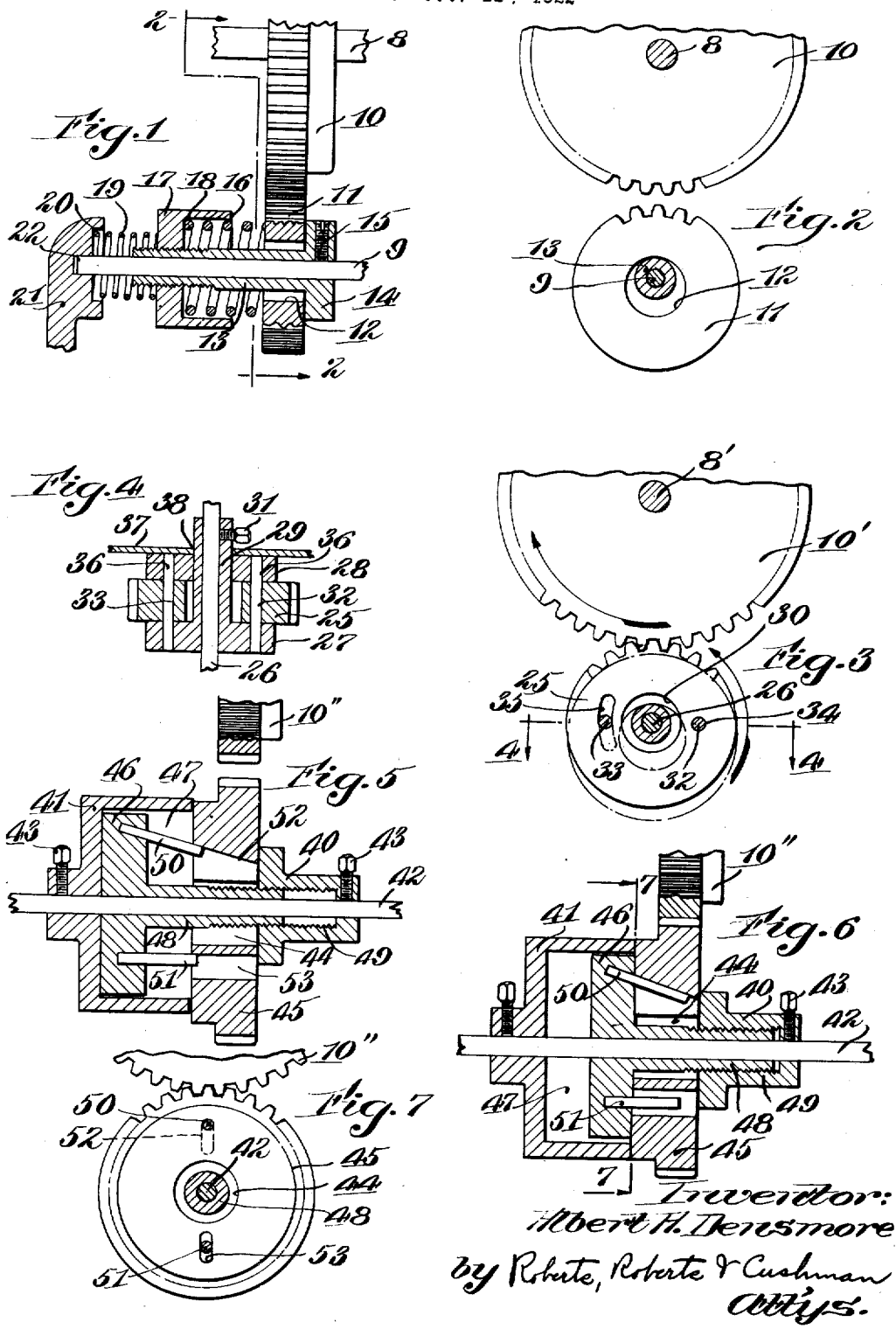

1,483,872

UNITED STATES PATENT OFFICE.

ALBERT A. DENSMORE, OF BROOKLINE, MASSACHUSETTS.

POWER-TRANSMISSION MECHANISM.

Application filed October 11, 1922. Serial No. 593,844.

*To all whom it may concern:*

Be it known that I, ALBERT A. DENSMORE, a citizen of the United States of America, and resident of Brookline, in the county of Norfolk and State of Massachusetts, have invented new and useful Improvements in Power-Transmission Mechanism, of which the following is a specification.

This invention relates to power transmission mechanism and in particular to engine starting devices.

Objects of the invention are to provide efficient mechanism of the type described characterized by simplicity, compactness, and slight relative movement of the gears in going from unmeshed to meshed position and vice versa, which can be constructed and assembled at a small fraction of the cost of devices in common use, and in general to improve, simplify and reduce the cost of such devices.

The invention comprises two rotatable shafts, and a gear on each shaft, one of the gears being movable radially into and out of mesh with the other or fixed gear. For engine starting purposes the movable gear is preferably on the driving shaft and is normally eccentrically disposed thereon out of mesh with the fixed or driven gear. The arrangement is such that the driving gear is moved automatically into mesh with the driven gear on rotation of the driving shaft and automatically out of mesh when the relative speed of rotation of the driven gear exceeds that of the driving gear. The shafts may be disposed at any desired angle relative to each other provided the teeth on the gears are cut at such an angle that they will mesh on radial movement of one of the gears. The invention further comprises suitable means for moving the movable gear from eccentric position where it is out of mesh to centered position on its shaft and into mesh with the fixed gear.

In order to illustrate the invention, typical species of the genus constituting the invention are shown by way of example in the accompanying drawings, in which:—

Fig. 1 is a longitudinal sectional view of one embodiment illustrating the features of the invention, the gears being in mesh, Fig. 2 is a sectional view on the line 2—2 of Fig. 1 showing the gears in elevation but out of mesh, Fig. 3 is a view similar to Fig. 2 of another embodiment of the invention, Fig. 4 is a sectional view on the line 4—4 of Fig. 3, Fig. 5 is a sectional view similar to Fig. 1 showing still another modification, the gears being out of mesh, Fig. 6 is a view similar to Fig. 5 showing the gears in mesh, Fig. 7 is a sectional view on the line 7—7 of Fig. 6 showing the gears in elevation.

The embodiments of the invention chosen for the purpose of illustration are all from the engine starting art. In the embodiment shown in Figs. 1 and 2 the driven shaft 8 is the main shaft of an internal combustion engine or a shaft geared thereto. The driving shaft 9 is preferably the armature shaft of an electric starting motor or a shaft geared thereto. Fast upon driven shaft 8 is a driven gear 10. In alignment with gear 10 is a driving gear 11 loosely mounted upon driving shaft 9 by the provision of an enlarged central bore 12 through which loosely passes an axial extension or sleeve 13 of an annular member 14 fast upon the shaft 9 in any suitable manner as by a set screw 15. Member 14 serves as a stop means or abutment for retaining gear 11 in alignment with gear 10. By the provision of the enlarged bore 12 of gear 11, the normal position of the latter is eccentric of shaft 9 as indicated in Fig. 2 in which position gear 11 is out of mesh with driven gear 10. To yieldingly hold movement of gear 11 in position against its stop member 14 a coil spring 16 is provided interposed between gear 11 and a movable abutment 17 having a threaded connection with the outer threaded end of sleeve 13. Member 17 may be partially bored out as indicated at 18 to receive one end of spring 16 and hold the latter in centered position relative to sleeve 13. Engaging the opposite or outer face of member 17 is a coil spring 19 seated in a bore 20 in a stationary member 21, preferably a portion of the engine frame, in which a bore 22 may be provided as a bearing for shaft 9.

The operation of this embodiment of the invention is as follows: On initial rotation of the driving shaft 9, member 17 by reason of its inertia, the frictional resistance of spring 19 to rotation of member 17 with the shaft, and by reason of the threaded connection between the member and sleeve 13 fast on the shaft is fed toward movable gear 11 compressing spring 16 and securely holding the movable gear 11 against stop member 14. Gear or pinion 11 thereupon begins to rotate with member 14 and shaft 9 and as the portion of the pinion offset from shaft 9 approaches gear 10 the teeth on the gears mesh and gear 10 forces the outwardly offset portion of gear 11 back toward shaft 9 until pinion 11 is centered upon its shaft, the pressure of spring 16 produced by the feeding in of abutment 17 serving yieldingly to clutch pinion 11 to its shaft whereby a driving connection is established between the shafts. As soon as the engine starts and gear 10 is thereby driven at a higher relative speed than gear 11, the latter is promptly thrown radially into the eccentric position shown in Fig. 2 and out of mesh, thus breaking the driving connection. During the throwing out of gear 11 abutment 17 is threaded back slightly upon the sleeve 13 thus reducing the pressure of spring 16 upon gear 11.

In Figs. 3 and 4 a very simple embodiment of the invention is disclosed in which the radial movement of the movable gear is effected through a cam arrangement. The pinion 25 on driving shaft 26 is mounted between two annular members or discs 27 and 28 (Fig. 4) rotatable with shaft 26. Member 27 may have an axial extension 29 extending through the enlarged central opening 30 in gear 25 and through a central opening in disc 28. A set screw 31 may be utilized to secure member 27 and its extension 29 to the driving shaft 26. Extending from disc 27 in which they have a pressed fit are axially disposed pins 32 and 33 passing through openings 34 and 35 respectively in gear 25 and having a running fit in openings 36 in disc 28. As indicated in Fig. 3 opening 35 in gear 25 is in the form of an elongate arcuate slot, so that the arrangement permits limited swinging movement of gear 25 about pin 32 as a pivot from the eccentric position relative to shaft 26 shown by broken lines in Fig. 3 to the centered position relative to shaft 26 shown in full lines in the same figure. The broken line position is the normal position of the gear or pinion 25 in which the driving connection between the shafts is broken and the full line position is the driving position with the gears in mesh. For the purpose of retaining disc 28 in engagement with gear 25 any suitable means may be provided such as an abutment or stop member 37 on the stationary frame of the engine which may have a bearing opening 38 for sleeve 29. In operation gear 25 is thrown into centered position immediately upon initial rotation of driving shaft 26 in the direction of the arrow Fig. 3, thus bringing it into mesh with driven gear 10' upon shaft 8'. As soon as the relative speed of driven shaft 8' exceeds that of driving shaft 26, gear 25 is either forced back or drops back under the force of gravity into eccentric position out of mesh with gear 10' thus breaking the driving connection.

In the embodiment shown in Figs. 5, 6, and 7 spaced and fixed abutment members in the form of collars 40 and 41 are fast upon the driving shaft 42 of the starting motor in any suitable manner as by means of set screws 43. Interposed between abutment collars 40 and 41 and loosely mounted upon the shaft 42 by reason of its enlarged central bore 44 is a radially movable driving gear 45. For the purpose of moving this gear radially into and out of mesh with driven gear 10'', a member 46 is provided axially movable in a recess 47 in collar 41, and provided with an integral axially disposed sleeve 48 which passes through the central bore 44 in gear 45 into threaded connection with an internally threaded axial bore 49 in sleeve 40. Extending from slidable member 46 are pins 50 and 51 received in openings 52 and 53 respectively in gear 45. Pin 50 and its complemental recess or opening 52 are angularly disposed relative to shaft 42 to produce the radial movement of gear 45 necessary for the meshing and unmeshing of the gears to make and break the driving connection. To permit the radial movement of gear 45 the openings 52 and 53 receiving pins 50 and 51 are in the form of radial slots as clearly shown in Fig. 7. Operation of this embodiment device is as follows:

On initial rotation of driving shaft 42 members 45 and 46 through inertia remain stationary, and abutment member 40 by reason of its threaded connection with extension 48 of member 46 draws the latter to the right, causing pins 50 and 51 to extend further into recesses 52 and 53, the camming action of inclined pin 50 serving to move the gear 45 radially until it is accurately centered upon shaft 42 in which position member 46 is in frictional driving engagement with gear 45 as indicated in Fig. 6. In this position gears 45 and 10'' are in mesh and a driving connection is established. As soon as the relative speed of the driven shaft is in excess of that of driving shaft 42, gear 45 is caused to turn faster than its shaft 42 and unscrews sleeve 48 from abutment 40, member 46 being moved to the left into the recess 47 of member 41 thus pivoting gear 45 to drop eccentrically of its shaft to the position shown in Fig. 6 and out of engagement with gear 10".

From the above it will be apparent that in mechanism embodying the features of this invention, the making and breaking of a driving connection by the engagement or meshing of gears is accomplished by radial movement of the gears and not by axial movement thereof as in prior devices, that such mechanism is characterized by few parts and extreme simplicity of operation (see particularly the modification illustrated in Figs. 3 and 4), and that marked economies in the cost of manufacture and assembly are possible with such mechanism. While this invention has been illustrated by engine starting devices in which the meshing and unmeshing of the gears is entirely automatic, it is obvious that the invention is adaptable to other uses in which manually operable means may be utilized if desired for making and breaking the driving connection.

I claim:

1. Power transmission mechanism for engine starting comprising a driving shaft and a driven shaft, a gear fast on said driven shaft, a gear normally eccentrically disposed on said driving shaft out of mesh with said first gear and capable of being centered on its shaft in which position it is in mesh with said first gear, and means associated with said driving shaft for centering the gear thereon to produce a driving connection between said shafts.

2. Power transmission mechanism for engine starting comprising a driven shaft having a gear fast thereon, a driving shaft having a gear normally eccentrically disposed thereon and movable radially thereof, said driving gear being arranged to be in mesh with said driven gear when centered upon its shaft, and means for centering said driving gear when said driving shaft is rotated and holding it centered to maintain a driving connection between said shafts.

3. Power transmission mechanism comprising driving and driven shafts, gears on said shafts, one of said gears being movable radially on its shaft into and out of mesh with the other gear, and cam means for effecting movement of said movable gear to make and break the driving connection between said shafts.

4. Power transmission mechanism for engine starting comprising a driven shaft having a gear fast thereon, a driving shaft having a pinion thereon movable radially into and out of mesh with said gear, and cam means for moving said pinion into mesh with said gear on rotation of said driving shaft, said pinion moving out of mesh when the relative speed of the driven shaft exceeds that of the driving shaft.

5. Power transmission mechanism for engine starting comprising a driven shaft having a gear thereon, a driving shaft having a pinion normally eccentrically disposed thereon out of mesh with said gear, and cam means for moving said pinion radially into mesh with said gear and permitting reverse movement of the pinion.

6. Power transmission mechanism for engine starting comprising a driven shaft having a gear thereon, a driving shaft having a pinion loosely mounted thereon and normally eccentrically disposed out of mesh with said gear, and means arranged to move said pinion radially until centered on its shaft and meshed with said gear, and to clutch said pinion to its shaft thereby to provide a driving connection between said shafts.

7. Power transmission mechansim for engine starting comprising a driven shaft having a gear thereon, a driving shaft having a pinion loosely mounted thereon and normally eccentrically disposed out of mesh with said gear, and means arranged to move said pinion radially until centered on its shaft and meshed with said gear, and to clutch said pinion to its shaft thereby to provide a driving connection between said shafts, said means reversing the movement of the pinion to unmesh the latter when the speed of the driven shaft exceeds that of the driving shaft.

8. Power transmission mechanism for engine starting comprising a driven shaft having a gear thereon, a driving shaft having a pinion eccentrically disposed thereon out of mesh with said gear, and cam means for moving said pinion radially into mesh with said gear including members extending into axial openings in said pinion.

9. Power transmission mechanism comprising driving and driven shafts, gears on said shafts arranged to mesh with each other, one of said gears being movable radially of its shaft from a position eccentric thereto and out of mesh with the other gear to a centered position on its shaft in mesh with said other gear, and means for moving said movable gear from eccentric to centered position including a member movable axially of said movable gear.

10. Engine starter mechanism, comprising a driven shaft having a gear secured thereto, a driving shaft provided with a threaded element, a pinion having an unthreaded bore, said pinion normally being out of mesh with the gear, means for causing the pinion to mesh with the gear, an abutment member having threaded engagement with the threaded element of the driving shaft, and means for positively transmitting motion of rotation from the abutment member to the pinion.

11. Engine starter mechanism, comprising a driven shaft having a gear secured thereto, a driving shaft, a threaded element turning therewith, a pinion normally out of mesh with the gear, said pinion having an unthreaded bore, and a threaded abutment member engaging the aforesaid threaded element and movable axially of the driving shaft, whereby to cause the pinion to move into mesh with the gear and positively to rotate with the driving shaft.

Signed by me at Boston, Massachusetts, this tenth day of October, 1922.

ALBERT A. DENSMORE.

DISCLAIMER.

1,483,872.—*Albert A. Densmore*, Brookline, Mass. POWER-TRANSMISSION MECHANISM. Patent dated February 19, 1924. Disclaimer filed February 24, 1928, by the patentee.

It is hereby stated that the words "means for positively transmitting motion of rotation from the abutment member to the pinion" as found in lines 10, 11, and 12 of claim 10, and the words "positively to rotate with the driving shaft" as found in lines 10 and 11 of claim 11 means a construction in which the transmission of motion *from the abutment member to the pinion* is independent of the function of springs or equivalent yieldable devices; and that the word "positively" as used in line 10 of claim 10 and in line 10 of claim 11 has the meaning,-without possibility of substantial relative rotational (angular) slip of the abutment and pinion, and is exclusive of springs or like yieldable elements for transmitting the driving force from the abutment to the pinion; and any broader meaning or interpretation of such words or terms is hereby disclaimed.

[*Official Gazette March 13, 1928.*]